Feb. 18, 1969     W. D. KOMHYR     3,428,542

METHOD OF SENSING THE OZONE IN UPPER ATMOSPHERE

Filed Oct. 11, 1965

INVENTOR

Walter D. Komhyr

BY Alvin J. Englert

AGENT

United States Patent Office 3,428,542
Patented Feb. 18, 1969

3,428,542
METHOD OF SENSING THE OZONE IN UPPER ATMOSPHERE
Walter D. Komhyr, 4343 Lee Highway,
Arlington, Va. 22207
Filed Oct. 11, 1965, Ser. No. 494,988
U.S. Cl. 204—195                    1 Claim
Int. Cl. B01k 3/00

ABSTRACT OF THE DISCLOSURE

A gas containing ozone is introduced into a cathode chamber containing a halide electrolyte and a platinum cathode. The spent gas is conveyed into an anode chamber containing a powdered carbon anode slurry, and is discharged at a point above the slurry. When the atmospheric pressure decreases and the carbon de-gasses, the discharged gas expands and breaks the ensuing bubbles, and the liquid drains back into the anode chamber.

---

Figure 1:
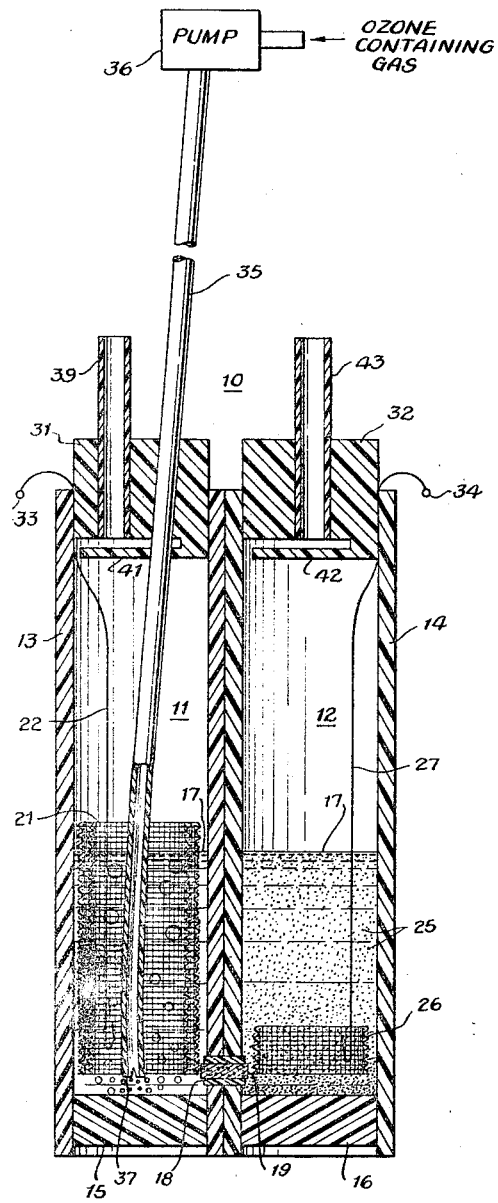

The invention described herein may be manufactured and used by or for the Government of the United States for governmental purposes without the payment to me of any royalty thereon, in accordance with the provisions of 35 United States Code (1952) Section 266.

This invention relates to ozone sensors, and more particularly to an ozone-sensing cell having a platinum cathode, halide solution electrolyte, and powdered carbon anode.

An object of this invention is to provide an ozone sensor capable of measuring ozone concentrations of only a few parts per hundred million volume.

Another object is to provide an ozone sensor which operates reliably at altitudes up to about 120,000 feet.

Still another object is to provide an ozone sensor which has a fast response time, and is small, lightweight and inexpensive, thereby suiting it for use on balloon sondes.

A further object is to provide an ozone sensor which is rugger, reliable, and simple to fabricate, use and service.

Briefly, the ozone-sensing cell of the present invention comprises a cathode chamber and an anode chamber, which are chemically linked by a suitable conduit, and partially filled with a buffered halide solution electrolyte. The cathode chamber contains a platinum cathode of large surface area, while the anode chamber contains a large volume of powdered carbon anode. The gas containing the ozone to be sensed is bubbled into the electrolyte in the cathode chamber, causing a series of chemical reactions whereby an electrical current flows through a load connected between the anode and cathode. The magnitude of the current is substantially proportional to the rate at which the ozone is introduced into the cell.

Figure 2:
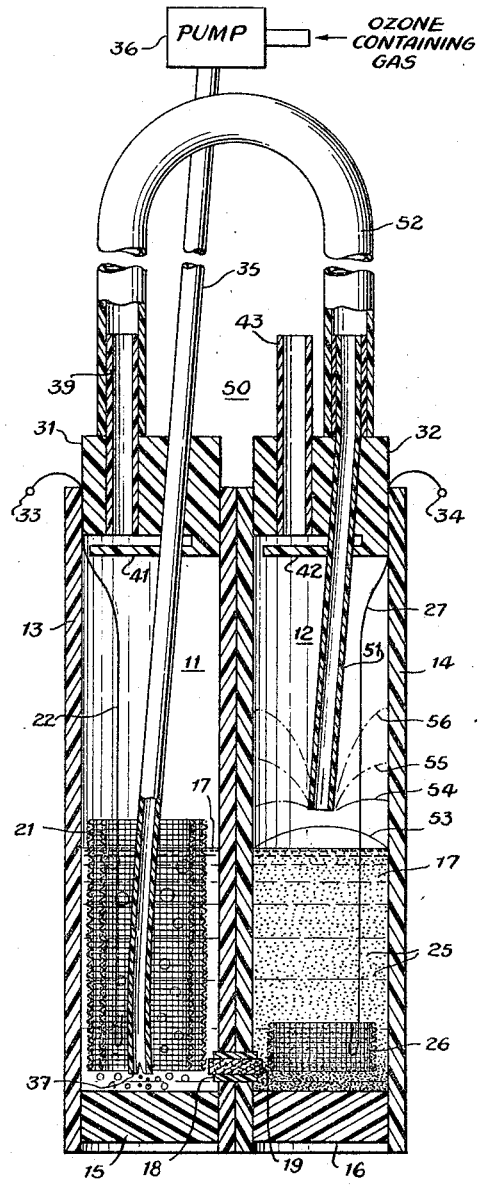

The invention will be described in more detail by reference to the accompanying drawing, in which like reference numerals refer to the same parts throughout the figures thereof, and:

FIG. 1 is a sectional view of an ozone-sensing cell illustrating the principles of the present invention, and FIG. 2 is a sectional view of a further embodiment of the invention, especially adapted for sensing ozone in the upper atmosphere.

Referring to FIG. 1, it will be seen that the ozone-sensing cell 10 of the present invention consists of a cathode chamber 11 and an anode chamber 12, provided respectively by cylindrical tubes 13 and 14 disposed side-by-side and fitted with bottom plugs 15 and 16. An electrolyte 17 approximately half-fills each of the chambers 11 and 12, which are connected together by a conduit 18 having a porous packing 19, to be further described hereinafter.

Disposed in the electrolyte in the cathode chamber 11 is a platinum cathode 21 of large surface area, preferably provided by a strip of platinum screen loosely rolled for several revolutions into a scroll-like cylinder. A platinum wire 22 is threaded through a portion of the screen, to electrically contact the screen. In the anode chamber 12, the electrolyte has a large volume of powdered carbon anode 25 added thereto, resulting in a slurry-like mixture. A small strip of platinum screen 26 is coiled for about one turn and immersed in the slurry to contact the powdered carbon anode 25. The carbon particles are prevented from entering the cathode chamber 11 by the porous packing 19 in the conduit 18 that connects the anode and cathode chambers together. A platinum wire 27 threaded into the carbon anode contact screen 26 provides an external anode lead.

The tops of the cylindrical tubes 13 and 14 are fitted with stoppers 31 and 32, the wires 22 and 27 extending between the stoppers and tubes in order to provide a cathode terminal 33 and an anode terminal 34. The stopper 31 is bored to receive a tube 35 extending from a small gas pump 36 to the bottom of the cathode chamber 11. A notch 37 is cut in the lower end of the tube 35 to prevent the tube from sealing against the plug 15. The pump 36 and tube 35 transfer the gas whose ozone content is to be measured into the electrolyte 17, where the gas bubbles through, and reacts with, the electrolyte. The spent gas is then exhausted to the atmosphere through a vent tube 39 provided in the stopper 31. To prevent any expulsion of electrolyte through the vent tube 39, the lower surface of the stopper is formed into a splash guard 41 that shields the end of the vent tube 39 from the cathode chamber. The stopper 32 of the anode chamber 12 is also provided with a splash guard 42 and vent tube 43 for venting any gases or vapors formed in the chamber to the atmosphere.

A specific illustrative example of a suitable electrolyte solution comprises 200 milliliters of distilled water, 2 grams of potassium iodide, 5 grams of potassium bromide, ¼ gram of sodium di-hydrogen phosphate and 1 gram of di-sodium hydrogen phosphate. Similarly, a specific illustrative example of a suitable powdered carbon anode comprises activated coconut charcoal, 0.7 gram being added to 2.5 milliliters of electrolyte solution in the anode chamber.

Since ozone is readily decomposed by many materials, the cylindrical tubes 13, 14, plugs 15, 16, conduit 18, and gas inlet tube 35 should be inert to ozone. Preferably, these items are fabricated from polytetrafluoroethylene, a plastic having the additional advantage of being a poor adsorber of ozone, iodine and water. The porous packing 19 in conduit 18 should be inert to the chemicals present in solution, and may comprise cotton string, which has been found to work satisfactorily. The stoppers 31, 32 and vent tubes 39, 43 need not be inert to ozone, since they contact only the spent gases. Advantageously, however, these latter elements are also constructed of polytetrafluoroethylene. For the description of an ozone-inert gas pump suitable for use as the pump 36 of the present invention, reference may be had to my copending application Ser. No. 382,977, filed July 15, 1964 and entitled "Rectangular-Piston Pump", now Patent No. 3,242,-869, issued Mar. 29, 1966.

The cylindrical tubes 13 and 14 may be maintained in side-by-side relationship by any suitable means, such as a layer of contact-type cement along their line of contact. The conduit 18 and bottom plugs 15, 16 of the tubes 13, 14 may also be cemented in place with contact cement, to prevent leakage of the electrolyte 17.

From the foregoing, it will readily be appreciated that the ozone-sensing cell 10 is easily constructed from a minimum number of relatively inexpensive components, and is lightweight, compact and rugged. Accordingly, it is highly suited to sensing ozone by balloon soundings, provided however, that the balloon does not ascend to high altitudes. At such altitudes, the powdered carbon anode 25 tends to de-gas, and froth the carbon-electrolyte slurry, expelling the slurry through the vent tube 43. If it is desired to use the cell at high altitudes, it should be modified in accordance with the present invention as illustrated in FIG. 2.

The cell 50 of FIG. 2 is identical to the cell 10 of FIG. 1, except that the stopper 32 in the anode chamber 12 is bored to receive an additional tube 51 that terminates a short distance above the surface of the slurry of electrolyte 17 and powdered carbon anode 25. This tube 51 is connected by a flexible tube 52 to the vent tube 39 of the cathode chamber 11. The tubes 51, 52 may comprise polytetrafluoroethylene, rubber or the like.

It will be recalled that the gas whose ozone content is to be measured is compressed in the pump 36 and bubbled through the electrolyte 17 in the cathode chamber 11, the spent gas being forced by the following gas through the vent tube 39. In the cell 50, this spent gas is forced via flexible tube 52 into tube 51 disposed adjacent the slurry in the anode chamber 12. If the slurry froths, as indicated at 53, 54, the spent gas is forced into the froth, and rapidly expands the froth, as shown at 55, 56. The froth then quickly collapses, and drains down the wall of the cylindrical tube 14 into the slurry. In this manner, the froth is never able to form a sufficient number of small bubbles and foam through the vent tube 43. In practice, the cell 50 has been used successfully to altitudes of about 120,000 feet, with no loss of the carbon-electrolyte slurry due to de-gassing of the carbon.

While the invention has been described by way of specific illustrative embodiments, it is to be understood that the invention is not to be limited to the exact details thereof. Various modifications of the details will readily occur to those skilled in the art; for example, it is apparent that the tubes 13, 14, plugs 15, 16 and conduit 18 may be molded as one piece. Accordingly, it is intended that the invention cover all such modifications as fall within the scope of the following claims.

What is claimed is:

1. The method of sensing the ozone in the upper atmosphere which comprises:

providing a cathode chamber with a buffered halide electrolyte and a platinum cathode; and an anode chamber with a slurry of said electrolyte and powdered carbon anode, and a platinum contact member;

joining the electrolytes in said cathode and anode chambers through a porous material;

passing a sample stream of said upper atmosphere through the electrolyte in said cathode chamber;

conveying the spent gases from said cathode chamber to said anode chamber;

injecting said spent gases into bubbles arising from said slurry in said anode chamber due to de-gassing of the carbon in said slurry under reduced atmospheric pressure;

bursting said bubbles and draining the liquid thereof back into said slurry; and measuring the current flowing through a load connected between said platinum cathode and said platinum anode contact member.

References Cited

UNITED STATES PATENTS

| | | | |
|---|---|---|---|
| 3,234,117 | 2/1966 | Rost et al. | 204—195 |
| 3,236,759 | 2/1966 | Robinson | 204—195 |
| 3,258,411 | 6/1966 | Hersch | 204—1.1 |

HOWARD S. WILLIAMS, *Primary Examiner.*

T. TUNG, *Assistant Examiner.*

U.S. Cl. X.R.

204—195, 265, 266